United States Patent
Kim et al.

(10) Patent No.: US 12,474,915 B2
(45) Date of Patent: Nov. 18, 2025

(54) VEHICULAR OTA SOFTWARE UPDATE APPARATUS AND METHOD THEREOF

(71) Applicants: Hyundai Motor Company, Seoul (KR); Kia Corporation, Seoul (KR)

(72) Inventors: Hyun Sang Kim, Hwaseong-Si (KR); Yun Sup Ann, Hwaseong-Si (KR)

(*) Notice: Subject to any disclaimer, the term of this patent is extended or adjusted under 35 U.S.C. 154(b) by 234 days.

(21) Appl. No.: 18/200,744

(22) Filed: May 23, 2023

(65) Prior Publication Data
US 2024/0192944 A1 Jun. 13, 2024

(30) Foreign Application Priority Data
Dec. 7, 2022 (KR) .................... 10-2022-0169860

(51) Int. Cl.
*G06F 8/65* (2018.01)
*G06F 21/34* (2013.01)

(52) U.S. Cl.
CPC ............... *G06F 8/65* (2013.01); *G06F 21/34* (2013.01)

(58) Field of Classification Search
CPC ....... G06F 8/65; G06F 21/44; H04L 41/0686; H04L 67/06
See application file for complete search history.

(56) References Cited

U.S. PATENT DOCUMENTS

| | | | |
|---|---|---|---|
| 10,678,530 B2* | 6/2020 | Sangameswaran | G07C 5/0808 |
| 2015/0116079 A1* | 4/2015 | Mishra | G07C 9/257 340/5.52 |
| 2019/0108014 A1* | 4/2019 | Nakamura | B60R 16/02 |
| 2019/0294429 A1* | 9/2019 | Mizutani | H04L 67/12 |
| 2021/0403016 A1* | 12/2021 | Jung | G06F 8/65 |

* cited by examiner

Primary Examiner — S. Sough
Assistant Examiner — Cheneca Smith
(74) Attorney, Agent, or Firm — Banner & Witcoff, Ltd.

(57) ABSTRACT

A vehicular over-the-air (OTA) software update apparatus and a method thereof are provided. The vehicular OTA software update apparatus includes a communication device that downloads a software update package from a server and a controller connected with the communication device. The controller determines whether it is possible to perform a software update based on at least one of a location of a vehicle access authentication means, whether the vehicle access authentication means is an update target, whether the vehicle access authentication means is used to enter a vehicle, or a combination thereof, after the downloading of the software update package is completed, and performs a software update of the update target using the software update package in response to determining that it is possible to perform the software update.

20 Claims, 7 Drawing Sheets

VEHICULAR OTA SOFTWARE UPDATE APPARATUS AND METHOD THEREOF

CROSS-REFERENCE TO RELATED APPLICATION

This application claims the benefit of priority to Korean Patent Application No. 10-2022-0169860, filed in the Korean Intellectual Property Office on Dec. 7, 2022, the entire contents of which are incorporated herein by reference.

TECHNICAL FIELD

The present disclosure relates to a vehicular over-the-air (OTA) software update apparatus and a method thereof.

BACKGROUND

As the software functions applied to vehicles have become more advanced and the proportion of software has increased, the application of an over-the-air (OTA) software update function for adding new functions and improving quality programs by means of software updates has been expanded after mass production of vehicles. A vehicular OTA software update may proceed as follows. If new software is registered with a server, the server may download new software to be updated to a central communication unit (CCU) and prepares for performing a software update. The CCU may identify an intention of a user by means of an audio video navigation (AVN) pop-up message and proceed with a software update of each performance controller. If normal message transmission/reception is allowed during an OTA software update, a risk that a reprogramming failure situation will occur may increase. Thus, a notification that it is not available to use the vehicle may be provided during the software update. However, even after the user agrees to perform a software update, a vehicle lock and unlock function using a smart key may operate during the software update.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

In some implementations, if a driver uses a vehicle using another vehicle access authentication schemes without a smart key and agrees to perform a software update after the power or ignition is off, a software update may be performed, but the driver may be unable to lock and leave the vehicle because it may be impossible to operate a digital key or another function such as biometric recognition.

One or more features of the present disclosure has been made to address the above-mentioned problems.

A vehicular over-the-air (OTA) software update apparatus may comprise: a communication device configured to receive a software update package from a server; and a controller coupled to the communication device. The controller may be configured to: after downloading of the software update package is completed, determine whether a software update associated with the software update package is executable based on at least one of: a location of a vehicle access authenticator; whether the vehicle access authenticator is an update target associated with software update package; or whether the vehicle access authenticator is used to enter a vehicle; and execute, based on a determination that the software update is executable, a software update of the update target using the software update package.

The vehicle access authenticator may comprise at least one of: a smart key, a biometric recognition device, a digital key, or a combination thereof.

The controller may be further configured to: determine, based on a power of the vehicle being off, a condition for the software update is satisfied; determine, based on the condition for the software update being satisfied, whether the vehicle access authenticator is present in the vehicle; and determine that the software update is executable further based on the vehicle access authenticator being present in the vehicle.

The controller may be further configured to: based on the vehicle access authenticator being not present in the vehicle, determine that the software update is inexecutable; output guidance information associated with the software update; based on a power of the vehicle being off after outputting the guidance information, reattempt to execute the software update; and based on reattempting to execute the software update and based on the vehicle access authenticator being present in the vehicle, determine that the software update is executable.

The controller may be further configured to: determine whether at least one second vehicle access authenticator, different from the vehicle access authenticator, is an update target associated with the software update package; based on a determination that the at least one second vehicle access authenticator is the update target associated with the software update package, determine whether a user enters the vehicle using the vehicle access authenticator; and based on a determination that the user enters the vehicle using the vehicle access authenticator, determine that the software update is executable.

The controller may be further configured to: determine whether a user enters the vehicle using a second vehicle access authenticator different from the vehicle access authenticator, wherein the second vehicle access authenticator is not an update target associated with the software update package; and based on a determination that the user enters the vehicle using the second vehicle access authenticator, determine that the software update is executable.

The controller may be further configured to: based on a determination that the user enters the vehicle without the vehicle access authenticator and the second vehicle access authenticator, output guidance information associated with the software update.

The controller may be further configured to: based on a determination that the user enters the vehicle without the vehicle access authenticator and the second vehicle access authenticator, suspend an execution of the software update.

The controller may be further configured to: based on a determination that the second vehicle access authenticator is present in the vehicle, output information indicating that it is possible for the user to enter the vehicle using the second vehicle access authenticator among a plurality of vehicle access authenticators associated with the user.

The vehicular OTA software update apparatus may further comprise a body controller configured to control a door lock of the vehicle and a door unlock of the vehicle. The controller may be configured to perform, based on a control command transmitted from the vehicle access authenticator during the software update, the door lock of the vehicle using the body controller.

A vehicular over-the-air (OTA) software update method may comprise: downloading, by a controller, a software update package from a server using communication device; after downloading of the software update package is completed, determining, by the controller, whether a software update associated with the software update package is executable based on at least one of: a location of a vehicle access authenticator; whether the vehicle access authenticator is an update target associated with software update package; or whether the vehicle access authenticator is used to enter a vehicle and based on a determination that the software update is executable, executing, by the controller, a software update of the update target using the software update package.

The vehicle access authenticator may comprise at least one of: a smart key, a biometric recognition device, a digital key, or a combination thereof.

The determining of whether the software update associated with the software update package is executable may comprise: determining, based on a power of the vehicle being off, a condition for the software update is satisfied; determining, based on the condition for the software update being satisfied, whether the vehicle access authenticator is present in the vehicle; and determining that the software update is executable further based on the vehicle access authenticator being present in the vehicle.

The method may further comprise: based on the vehicle access authenticator being not present in the vehicle, determining that the software update is inexecutable; outputting guidance information associated with the software update; based on a power of the vehicle being off after outputting the guidance information, reattempting to execute the software update; and based on reattempting to execute the software update and based on the vehicle access authenticator being present in the vehicle, determining that the software update is executable.

The determining of whether the software update associated with the software update package is executable may comprise: determining whether at least one second vehicle access authenticator, different from the vehicle access authenticator, is an update target associated with the software update package; based on a determination that the at least one second vehicle access authenticator is the update target associated with the software update package, determining whether a user enters the vehicle using the vehicle access authenticator; and based on a determination that the user enters the vehicle using the vehicle access authenticator, determining that the software update is executable.

The method may further comprise: determining whether a user enters the vehicle using a second vehicle access authenticator different from the vehicle access authenticator, wherein the second vehicle access authenticator is not an update target associated with the software update package; and based on a determination that the user enters the vehicle using the second vehicle access authenticator, determining that the software update is executable.

The method may further comprise: based on a determination that the user enters the vehicle without the vehicle access authenticator and the second vehicle access authenticator, outputting guidance information associated with the software update.

The method may further comprise: based on a determination that the user enters the vehicle without the vehicle access authenticator and the second vehicle access authenticator, suspending an execution of the software update.

The method may further comprise: based on a determination that the second vehicle access authenticator is present in the vehicle, outputting information indicating that it is possible for the user to enter the vehicle using the second vehicle access authenticator among a plurality of vehicle access authenticators associated with the user.

The method may further comprise: based on a control command transmitted from the vehicle access authenticator during the software update, controlling a body controller to perform a door lock of the vehicle.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
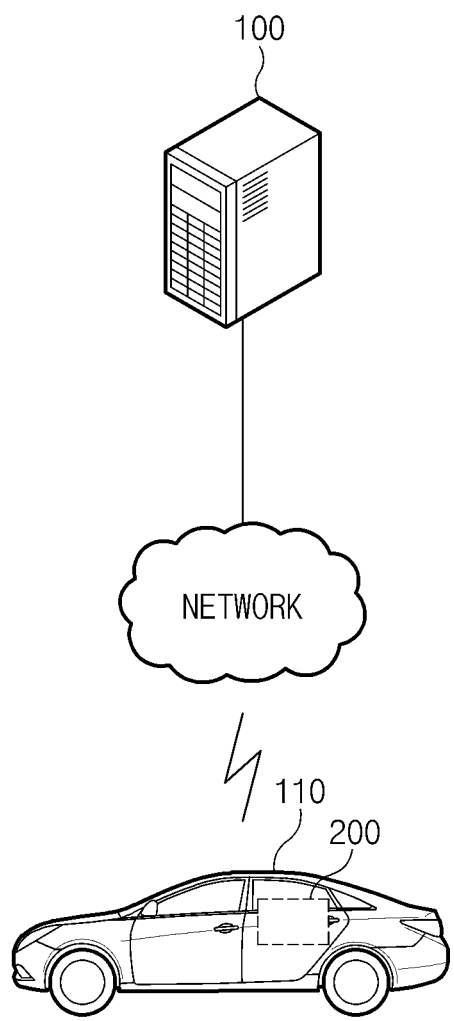
FIG. 1 is a block diagram illustrating a configuration of a vehicular software update system.

Hereinafter, various examples of the present disclosure will be described in detail with reference to the exemplary drawings. In the drawings, the same reference numerals will be used throughout to designate the same or equivalent elements. In addition, a detailed description of well-known features or functions may be simplified or omitted in order not to unnecessarily obscure the gist of the present disclosure.

In describing the components according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a vehicular software update system.

The vehicular software update system may support a software update to keep software applied to a vehicle system up to date using an over-the-air (OTA) technology. Referring to FIG. 1, the vehicular software update system may include a server 100 and a vehicular OTA software update apparatus 200 (hereinafter referred to as an "apparatus 200") loaded in a vehicle 110.

The server 100 may store and manage software for each vehicle type and/or each electronic control device (ECU) in a database. The server 100 may register new software provided from a software developer in the database as latest version software. The server 100 may transmit version information of newly registered software to the apparatus 200. The server 100 may transmit latest version software (e.g., a software update package) depending on the request of the apparatus 200.

The apparatus 200 may receive the version information of the newly registered software transmitted from the server 100. The apparatus 200 may compare the version information of the newly registered software with version information of software applied to the system of the vehicle 110 to determine whether it is necessary to perform a software update. For example, if version information of new software of a motor controller is received from the server 100, the apparatus 200 may compare version information of current software applied to the motor controller with the received version information of the new software. If the version information of the current software and the received version information of the new software are identical to each other, the apparatus 200 may determine that it is unnecessary to perform a software update. If the version information of the current software and the received version information of the new software are not identical to each other, the apparatus 200 may determine that it is necessary to perform a software update. If it is determined that it is necessary to perform the software update, the apparatus 200 may request the server 100 to download the new software (e.g., download in a form of a software update package).

The apparatus 200 may download the software update package from the server 100. If the downloading of the software update package is completed, the apparatus 200 may output a message querying whether a user agrees to perform a software update when the ignition is off. The apparatus 200 may determine whether to proceed with the software update depending on a response (or an intention) of the user to the output query message. If the user agrees to perform the software update when the ignition is off, the apparatus 200 may determine to proceed with the software update.

The apparatus 200 may determine whether the state of the vehicle 110 satisfies a condition where it is possible to perform an OTA software update. The condition in which it is possible to perform the OTA software update may include that the ignition is off, the gear position is the parking (P) stage, the parking brake is set, the exterior lamp is turned off, the engine hood is closed, or the like.

If the state of the vehicle 110 satisfies the condition in which it is possible to perform the OTA software update, the apparatus 200 may determine to enter a software update mode. When entering the software update mode, the apparatus 200 may determine whether to start to perform (or execute) a software update based on a location of a vehicle access authenticator, whether the vehicle access authenticator is an update target, and/or the like. The vehicle access authenticator may be an authenticator used to determine whether a user is a target capable of entering the vehicle 110, which may include at least one of a smart key (e.g., keyless authorization systems or an electronic access and authorization system), a digital key stored in a smartphone, a biometric recognition device, or a combination thereof. If it is determined to start to perform the software update, the apparatus 200 may update current software of an update target to the software of the latest version using the downloaded software update package.

Figure 2:
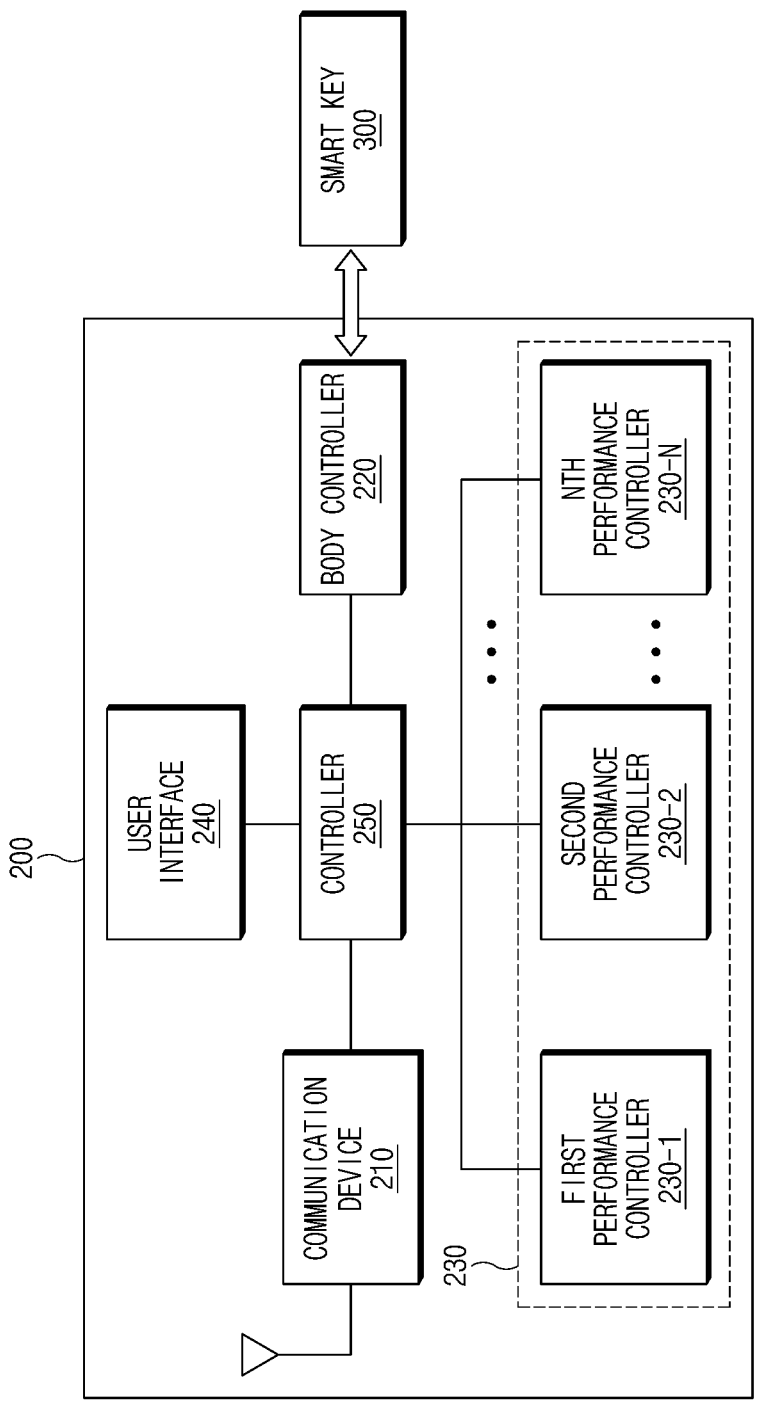
FIG. 2 is a block diagram illustrating a configuration of a vehicular OTA software update apparatus.

FIG. 2 is a block diagram illustrating a configuration of a vehicular OTA software update apparatus.

A vehicular OTA software update apparatus 200 (hereinafter referred to as an "apparatus 200") may include a communication device 210, a body controller 220, a performance controller 230, a user interface 240, and a controller 250, which may be connected via an in-vehicle network (IVN)). The IVN may be implemented as a controller area network (CAN), a media oriented systems transport (MOST) network, a local interconnect network (LIN), an Ethernet, an X-by-Wire (Flexray), and/or the like.

The communication device 210 may support wireless communication between the apparatus 200 and a server (e.g., a server 100 of FIG. 1). The communication device 210 may receive a software update package (e.g., read only memory (ROM) data) for each performance controller 230 in an OTA manner. The communication device 210 may transmit (or deliver) the received software update package to the controller 250. The software update package may include new software for each performance controller 230 which is an update target.

The communication device 210 may transmit and receive data with the server 100 using a wireless communication technology (e.g., wireless-fidelity (Wi-Fi), long term evolution (LTE), international mobile telecommunication-2020 (IMT-2020), or the like). The communication device 210 include a transceiver which transmits and receives data through an antenna. Such a communication device 210 may be a data communication unit (DCU).

The body controller 220 may control one or more operations and/or functions of a vehicle (e.g., vehicle access, starting, tire pressure, and the like). The vehicle access may include a door lock and a door unlock of a vehicle 110 of FIG. 1. The body controller 220 may recognize a location of a smart key 300 through wireless communication with the smart key 300 using a low frequency (LF) antenna and a radio frequency (RF) receiver. The LF antennas may be installed in door handles of the vehicle 110. The LF antenna may transmit an LF signal for recognizing (or searching for) the smart key 300 under an instruction of the body controller 220. The RF receiver may receive a response signal to the LF signal transmitted from the smart key 300. The smart key 300 may include an LF receiver for receiving an LF signal transmitted from the vehicle 110, an RF transmitter for transmitting an RF signal, a processor for controlling the overall operation of the smart key 300, and a memory storing software executed by the processor.

If a vehicle door lock command or a vehicle door unlock command is received from another electronic device (e.g., the smart key 300, an ECU, and/or the like), the body controller 220 may control a door actuator depending on the received command to perform a lock or unlock of a vehicle door.

The performance controller 230 may be an OTA software update target (hereinafter referred to as an "update target"), which may be an ECU loaded in the vehicle 110 to perform a predetermined function (or a driver assistance function, an obstacle detection function, and/or the like). The performance controller 230 may include N performance controllers 230-1, 230-2, . . . , and 230-N, where N is 1 or more. Although not illustrated in the drawings, the performance controller 230 may include a processor, a memory, a communication circuit, and the like.

The performance controller 230 may receive and store software for update (or a software update package), which is transmitted from the controller 250, in the memory. The performance controller 230 may perform reprogramming using the software for update to update software currently installed in the performance controller 230 (e.g., control logic previously stored in the memory).

The user interface 240 may be a device which may enable interactions between a vehicle system and a user. The user interface 240 may include an input device (e.g., a keyboard, a touch pad, a microphone, a touch screen, and/or the like) for generating data according to manipulation of the user, an output device (e.g., a display, a speaker, a tactile signal output device, and/or the like) for outputting information according to an operation of the vehicle system, and/or the like. Such a user interface 240 may be implemented as an audio, video, navigation (AVN) terminal, an in-vehicle infotainment terminal, a telematics terminal, and/or the like.

The controller 250 may serve as a vehicle gateway and may oversee an OTA software update function (or an OTA function). The controller 250 may be implemented as a central communication unit (CCU). Such a controller 250 may include at least one processor. The at least one processor may include at least one of an application specific integrated circuit (ASIC), a digital signal processor (DSP), programmable logic devices (PLD), field programmable gate arrays (FPGAs), a central processing unit (CPU), microcontrollers, microprocessors, or a combination thereof. The controller 250 may include a memory which stores instructions executed by the at least one processor. The memory may be a non-transitory storage medium located inside and/or outside the processor and may transmit and receive data with the at least one processor through various known configurations. The memory may include at least one of a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), or a combination thereof. The memory may store the software update package received through the communication device 210. The memory may store OTA control logic, update management logic, update execution logic, and/or the like, which are/is executed by the at least one processor.

The controller 250 may download a software update package (or ROM data) from the server 100. The communication device 210 may access the server 100 depending on a control command of the controller 250 and may download the software update package of an update target (e.g., the performance controller 230 or the like).

The controller 250 may identify whether the downloading of the software update package is completed through communication with the communication device 210. After it is identified the downloading of the software update package is completed, when the ignition is off, the controller 250 may output a query message for identifying an intention of a user to proceed with an OTA software update. For example, when the ignition is off in the state in which the downloading of the software update package is completed, the controller 250 may output (or display) the query message (e.g., "Please select the start button to proceed with the software update now") on a display of the user interface 240.

The controller 250 may determine whether the user agrees to proceed with a software update depending on a response of the user to the output query message. The controller 250 may identify whether the user agrees or does not agree to proceed with a software update based on the user response.

If it is determined that the user agrees to proceed with the software update, the controller 250 may determine whether a vehicle state satisfies an OTA software update performance condition. The controller 250 may identify whether the ignition of the vehicle 110 is off, whether the shift gear of the vehicle 110 is located in the P stage, whether the exterior lamp of the vehicle 110 is turned off, whether the parking brake of the vehicle 110 is set, and/or whether the engine hood of the vehicle 110 is closed. When the ignition of the vehicle 110 is off, when the shift gear is located in the P stage, when the exterior lamp is turned off, when the parking brake is set, and/or when the engine hood is closed, the controller 250 may determine that the vehicle state satisfies the OTA software update performance condition.

If it is determined that the vehicle state satisfies the OTA software update performance condition, the controller 250 may determine whether the smart key 300 is present in the interior of the vehicle 110. The controller 250 may transmit a CAN signal (e.g., FOB_SEARCHING==YES) indicating a smart key search request to the body controller 220. By transmitting an LF signal through the LF antenna and receiving a response signal transmitted from the smart key 300, the body controller 220 may identify whether the smart key 300 is present in the interior of the vehicle 110. If it is identified that the smart key 300 is present in the interior of the vehicle 110, the body controller 220 may transmit a CAN signal (e.g., FOB_EXIST==YES) indicating that the smart key 300 is present in the interior of the vehicle 110 to the controller 250. The body controller 220 may transmit a CAN signal (e.g., FOB_EXIST==NO) indicating that the smart key 300 is not present in the interior of the vehicle 110 to the controller 250, for example, if it is determined that the smart key 300 is not present in the interior of the vehicle 110.

If it is determined that the smart key 300 is present in the interior of the vehicle 110, the controller 250 may determine to start an OTA software update and may perform an OTA software update procedure with the performance controller 230. The controller 250 may transmit the software update package to the at least one performance controller 230 which is an update target. The update target may reprogram new software included in the software update package to perform a software update.

While performing the OTA software update, the controller 250 may cooperate with the body controller 220 to perform a vehicle lock. The controller 250 may allow the body controller 220 to perform a vehicle lock or unlock during the OTA software update. If a vehicle lock command (or a door lock command) is received from the smart key 300 after the user (e.g., the driver) alights from the vehicle 110, the body controller 220 may perform a vehicle lock. If a vehicle unlock command (or a door unlock command) is received from the smart key 300 in the state in which the user alights from the vehicle 110, the body controller 220 may perform a vehicle unlock.

If the OTA software update is completed, the controller 250 may end the vehicle OTA software update procedure.

If it is determined that the user does not agree to proceed with the software update or if it is determined that the vehicle state does not satisfy the OTA software update performance condition, the controller 250 may reattempt to perform an OTA software update when the ignition is next off.

If it is determined that the smart key 300 is not present in the interior of the vehicle 110, the controller 250 may output guidance information for proceeding with an OTA software update. If the smart key 300 is not present in the interior of the vehicle 110, the controller 250 may transmit a CAN signal (e.g., OTA_NO_FOB==YES) indicating that it is unable to proceed with the OTA software update to the user interface 240. If the CAN signal transmitted from the controller 250 is received, the user interface 240 may display the information (e.g., "The smart key is required to perform an OTA software update.") on the display (e.g., in the form of a pop-up). As a result, the apparatus 200 may guide the driver to possess the smart key 300 and proceed with an OTA software update when the driver drives the vehicle 110 at a later time.

After outputting the guidance for proceeding with the OTA software update, when the ignition is next off, the controller 250 may reattempt to perform an OTA software update.

Figure 3:
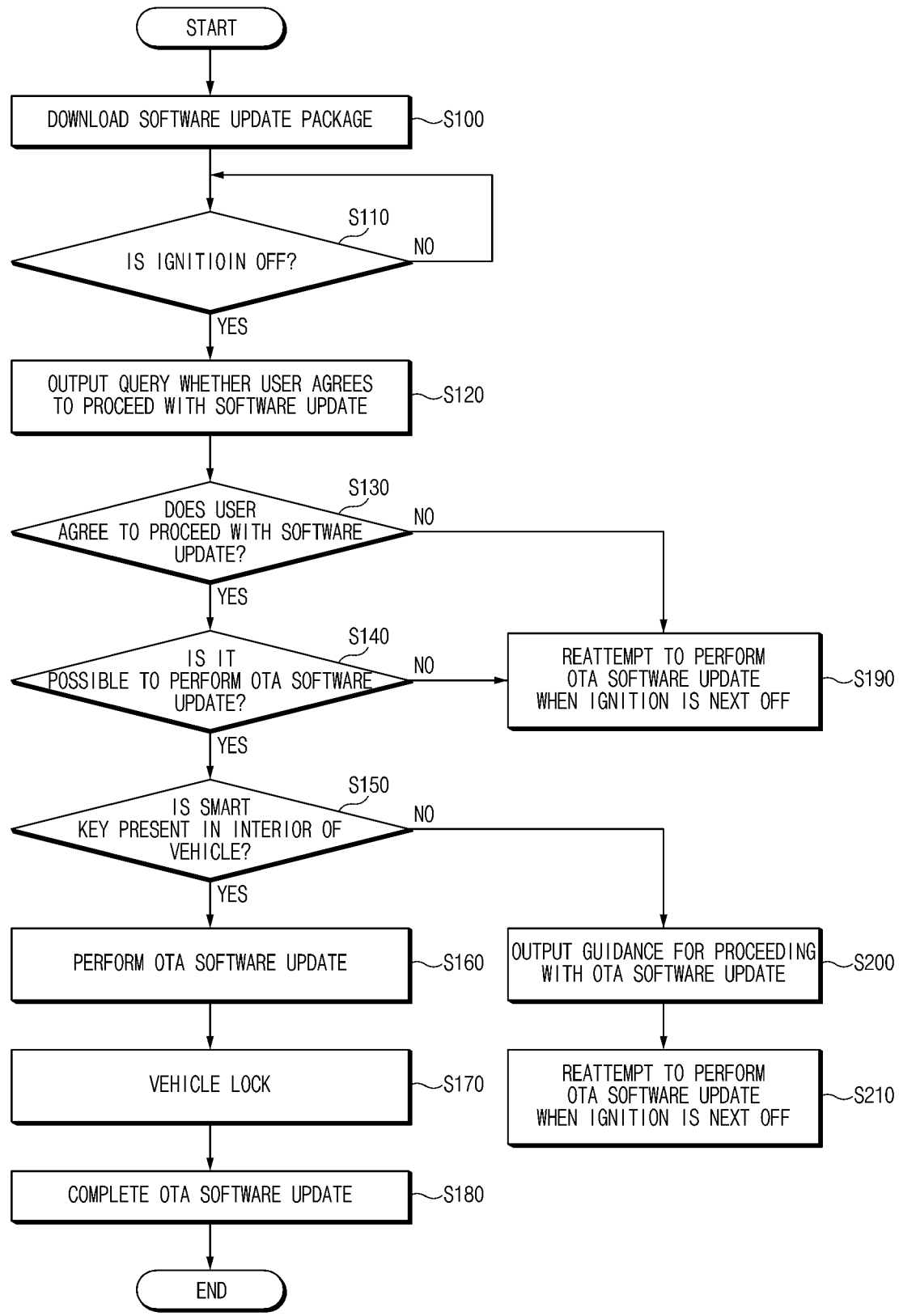
FIG. 3 is a flowchart illustrating a vehicular OTA software update method.

FIG. 3 is a flowchart illustrating a vehicular OTA software update method.

In an example, a controller 250 of an apparatus 200 shown in FIG. 2 may perform an OTA software update depending on the vehicular OTA software update method shown in FIG. 3.

In S100, the controller 250 may download a software update package from a server 100 of FIG. 1 using a communication device 210 of FIG. 2. The controller 250 may request the communication device 210 to download new software of an update target. The communication device 210 may request the server 100 to download the new software of the update target depending on the request of the controller 250 and may receive the new software (e.g., the software update package) transmitted from the server 100.

In S110, the controller 250 may determine whether the ignition of a vehicle 110 of FIG. 1 is off. The controller 250 may identify whether the downloading of the software update package is completed through communication with the communication device 210. After the downloading of the software update package is completed, the controller 250 may determine whether the ignition is off.

If it is determined that the ignition of the vehicle 110 is off, in S120, the controller 250 may output a message querying whether a user agrees to proceed with a software update. For example, when the ignition is off, the controller 250 may output a pop-up message querying whether the user agrees to proceed with the software update on a display.

In S130, the controller 250 may determine whether the user agrees to proceed with the software update depending on a response of the user to the output query message. The controller 250 may identify whether the user agrees or does not agree to proceed with a software update based on the user response.

If it is determined that the user agrees to proceed with the software update, in S140, the controller 250 may determine whether a vehicle state is a state in which it is possible to perform an OTA software update. The controller 250 may identify whether the ignition of the vehicle 110 is off, whether the shift gear of the vehicle 110 is located in the P stage, whether the exterior lamp of the vehicle 110 is turned off, whether the parking brake of the vehicle 110 is set, and/or whether the engine hood of the vehicle 110 is closed.

If it is determined that the vehicle state is the state in which it is possible to perform the OTA software update, in S150, the controller 250 may determine whether the smart key 300 is present in the interior of the vehicle 110. The controller 250 may identify a location of the smart key 300 using a body controller 220 of FIG. 2. By transmitting an LF signal to search for the smart key 300 depending on the request of the controller 250 and receiving a response signal (or an RF signal) transmitted from the smart key 300, the body controller 220 may determine whether the smart key 300 is located in the interior of the vehicle 110. By analyzing signal intensity, a direction, and the like of the received response signal, the body controller 220 may determine a location of the smart key 300. If the location of the smart key 300 is identified, the body controller 220 may transmit information indicating that the smart key 300 is present or is not present in the interior of the vehicle 110 to the controller 250.

If it is determined that the smart key 300 is present in the interior of the vehicle 110, in S160, the controller 250 may perform an OTA software update. When the OTA software update starts, the controller 250 may transmit a software update package to a performance controller 230 which is an update target. The performance controller 230 may reprogram new software included in the software update package to perform a software update.

In S170, the controller 250 may cooperate with the body controller 220 to perform a vehicle lock during the OTA software update. The controller 250 may allow the body controller 220 to perform a vehicle lock or unlock during the OTA software update. If a vehicle lock command (or a door lock command) is received from the smart key 300 after the user (e.g., the driver) alights from the vehicle 110, the body controller 220 may perform a vehicle lock. If a vehicle unlock command (or a door unlock command) is received from the smart key 300 in the state in which the user alights from the vehicle 110, the body controller 220 may perform a vehicle unlock.

If the OTA software update is completed, in S180, the controller 250 may end the vehicle OTA software update.

If it is determined that the user does not agree to proceed with the software update in S130 or if it is determined that the vehicle state is the state in which it is impossible to perform the OTA software update, in S190, the controller 250 may reattempt to perform an OTA software update when the ignition is off at a later time.

If it is determined that the smart key 300 is not present in the interior of the vehicle 110 in S150, in S200, the controller 250 may output guidance information for proceeding with an OTA software update.

After outputting the guidance information for proceeding with the OTA software update, in S210, when the ignition is off at a later time, the controller 250 may reattempt to perform an OTA software update.

Figure 4:
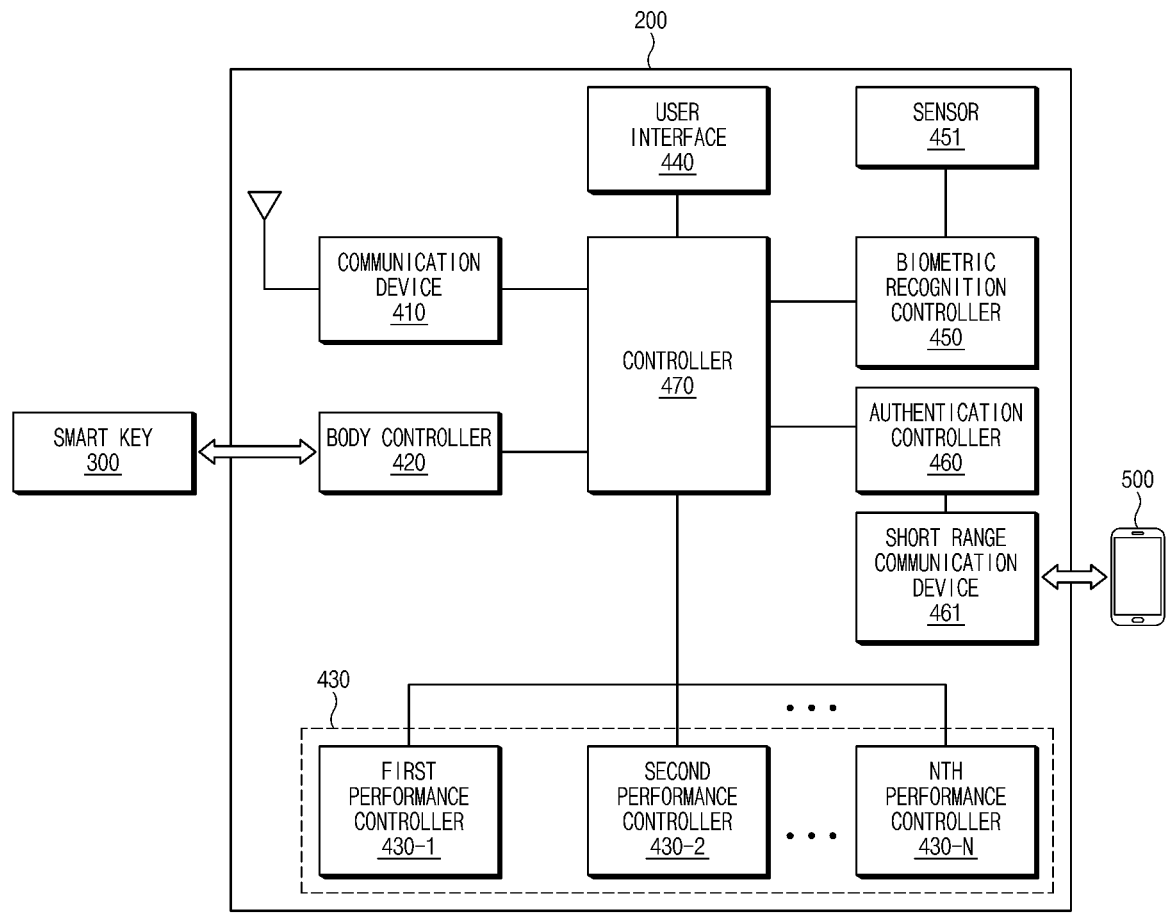
FIG. 4 is a block diagram illustrating a configuration of a vehicular OTA software update apparatus.

FIG. 4 is a block diagram illustrating a configuration of a vehicular OTA software update apparatus.

A vehicular OTA software update apparatus 200 (hereinafter referred to as an "apparatus 200") may include a communication device 410, a body controller 420, a performance controller 430, a user interface 440, a biometric recognition controller 450, a short range communication device 461, and a controller 470, which may be connected through an IVN. The IVN may be implemented as a CAN, a MOST network, a LIN, an Ethernet, and/or the like.

The communication device 410 may support wireless communication between the apparatus 200 and a server 100 of FIG. 1. The communication device 410 may transmit and receive data with the server 100 using a wireless communication technology (e.g., Wi-Fi, LTE, IMT-2020, or the like). The communication device 410 may transmit and receive data through an antenna. Such a communication device 410 may be a DCU.

The body controller 420 may control one or more operations and/or functions of the vehicle (e.g., vehicle access, starting, tire pressure, and the like). The vehicle access may include a door lock and a door unlock of a vehicle 110 of FIG. 1. The body controller 420 may recognize a smart key 300 using an LF antenna and an RF receiver. The LF antennas may be installed in door handles of the vehicle 110. The LF antenna may transmit an LF signal for recognizing (or searching for) the smart key 300 under an instruction of the body controller 420. The RF receiver may receive a response signal to the LF signal transmitted from the smart key 300. The smart key 300 may include an LF receiver for receiving an LF signal transmitted from the vehicle 110, an RF transmitter for transmitting an RF signal, a processor for controlling the overall operation of the smart key 300, and a memory storing software executed by the processor.

If a vehicle door lock command or a vehicle door unlock command is received from another electronic device (e.g., the smart key 300, an ECU, and/or the like), the body controller 420 may control a door actuator depending on the received command to perform a lock or unlock of a vehicle door.

The performance controller 430 may be an OTA software update target (hereinafter referred to as an "update target"), which may be an ECU loaded in the vehicle 110 to perform a configured (e.g., predetermined) function (or a driver assistance function, an obstacle detection function, and/or the like). The performance controller 430 may include N performance controllers 430-1, 430-2, . . . , and 430-N, where N is 1 or more. Although not illustrated in the drawing, the performance controller 430 may include a processor, a memory, a communication circuit, and the like.

The performance controller 430 may receive and store software for update (e.g., a software update package), which may be transmitted from the controller 470, in the memory. The performance controller 430 may perform reprogramming using the software for update to update software installed in the performance controller 430 (e.g., control logic previously stored in the memory).

The user interface 440 may be a device which may enable interactions between a vehicle system and a user. The user interface 440 may include an input device (e.g., a keyboard, a touch pad, a microphone, a touch screen, and/or the like) for generating data according to manipulation of the user, an output device (e.g., a display, a speaker, a tactile signal output device, and/or the like) for outputting information according to an operation of the vehicle system. Such a user interface 440 may be implemented as an AVN terminal, an infotainment terminal, a telematics terminal, and/or the like.

The biometric recognition controller 450 may recognize a biometric signal of the user using a sensor 451 and may perform vehicle access authentication of the user. The sensor 451 may include an image sensor (e.g., a camera), a finger scan sensor, and the like. As an example, the biometric recognition controller 450 may capture a face image of the user using the camera and may compare the captured face image with a face image previously stored in the memory to perform the vehicle access authentication of the user. As another example, the biometric recognition controller 450 may scan a fingerprint of the user by using the finger scan sensor and may compare the scanned fingerprint image with a previously stored fingerprint image to perform the vehicle access authentication of the user. A biometric recognition device including the biometric recognition controller 450 and the sensor 451 may be used as a vehicle access authenticator.

An authentication controller 460 may perform the vehicle access authentication of the user using a short range communication device 461. The short range communication device 461 may transmit and receive data through short range wireless communication with a user terminal 500. The short range communication device 461 may include a near field communication (NFC) circuit, an ultra-wideband (UWB) circuit, a Bluetooth (BLE) circuit, and/or the like. The user terminal 500 may include a digital key which provides a function of locking and unlocking doors of the vehicle 110, remotely starting the vehicle 110, and/or opening the trunk of the vehicle 110, by using a remote control. The digital key may be implemented as an application to be installed in the user terminal 500 and may be used as a vehicle access authenticator.

The controller 470 may serve as a vehicle gateway and may oversee an OTA software update function (or an OTA function). The controller 470 may be implemented as a central communication unit (CCU). The controller 470 may include at least one processor. The at least one processor may include at a least one of an ASIC, DSP, PLD, FPGAS, a CPU, microcontrollers, microprocessors, or a combination thereof. The controller 470 may include a memory which stores instructions (or a program or software) executed by the at least one processor. The memory may be a non-transitory storage medium located inside and/or outside the at least one processor and may transmit and receive data with the at least one processor through various known configurations. The memory may include at least one of a flash memory, a hard disk, an SSD, a RAM, an SRAM, a ROM, a PROM, an EEPROM, an EPROM, a combination thereof. The memory y may store a software update package received through the communication device 410. The memory may store OTA control logic, update management logic, update execution logic, and/or the like, which are/is executed by the at least one processor.

The controller 470 may download a software update package from a server 100 of FIG. 1 using the communication device 410. The controller 470 may request the communication device 410 to download new software of an update target. The communication device 410 may request the server 100 to download a software update package including new software of the update target depending on the request of the controller 470 and may receive the software update package (or ROM data) transmitted from the server 100.

The controller 470 may identify whether the biometric recognition controller 450 and the authentication controller 460 are update targets. For example, the controller 470 may determine whether to perform an OTA software update for a digital key function and whether to perform an OTA software update for a biometric recognition function.

If it is identified that the biometric recognition controller 450 and the authentication controller 460 are the update targets, the controller 470 may output guidance information that it is possible for the user to enter the vehicle 110 using the smart key 300 during the OTA software update. The controller 470 may guide the user to enter the vehicle 110 by using the smart key 300 as a vehicle access authenticator during the OTA software update. For example, the controller 470 may output a pop-up message that it is possible to perform a door lock (or a vehicle lock) of the vehicle 110 using the smart key 300 during the OTA software update on the display.

If it is identified that the biometric recognition controller 450 and the authentication controller 460 are the update targets, the controller 470 may determine whether the user enters the vehicle 110 using the smart key 300. The controller 470 may identify whether the smart key 300 is used to enter the vehicle 110 based on a vehicle access history provided from a vehicle access system. As a result, the controller 470 may determine whether the user possesses the smart key 300. For example, if it is identified that the user performs the door unlock of the vehicle 110 using the smart key 300 when using the vehicle 110 this time, the controller 470 may determine that the user possesses the smart key 300.

If it is determined that the user enters the vehicle 110 using the smart key 300, the controller 470 may start an OTA software update when the ignition is off. If the ignition is off, the controller 470 may transmit a software update package to an update target (e.g., the performance controller 430, the biometric recognition controller 450, and/or the authentication controller 460). The update target may update software installed in the update target to software of a latest version using the software update package.

If it is determined that the user does not enter the vehicle 110 using the smart key 300 (e.g., if it is determined that the user does not possess the smart key 300), the controller 470 may output guidance information indicating that the user needs to enter the vehicle 110 using the smart key 300 when the user uses the vehicle 110 at a later time. If it is determined that another access authenticator (e.g., biometric recognition or a digital key except for the smart key 300 is used to enter the vehicle 110), the controller 470 may display a guidance message (e.g., "The smart key is required for an OTA software update.") on a display of the user interface 440.

If it is identified that the authentication controller 460 is the update target and the biometric recognition controller 450 is not the update target, the controller 470 may output guidance information that it is possible for the user to enter the vehicle 110 using the smart key 300 or a biometric recognition function during the OTA software update. The controller 470 may output a pop-up message indicating that it is possible to enter the vehicle 110 using the smart key 300 or the biometric recognition function during the OTA software update on the display of the user interface 440.

If it is identified that the authentication controller 460 is the update target and the biometric recognition controller 450 is not the update target, the controller 470 may determine whether the user enters the vehicle 110 using the smart key 300 or the biometric recognition function. The controller 470 may identify whether to execute a door unlock of the vehicle 110 by using the smart key 300 or the biometric recognition function based on a vehicle access history. If it is determined that the user enters the vehicle 110 using the smart key 300 or the biometric recognition n function, the controller 470 may execute an OTA software update (e.g., when the ignition is off). The controller 470 may transmit a software update package to the update target to perform a software update.

If it is identified that the biometric recognition controller 450 is the update target and the authentication controller 460 is not the update target, the controller 470 may output guidance information that it is possible for the user to enter the vehicle 110 using the smart key 300 or the digital key during the OTA software update. For example, the controller 470 may output that it is possible for the user to enter the vehicle 110 using the smart key 300 or the digital key during the OTA software update as a voice message to notify the user of it.

If it is identified that the biometric recognition controller 450 is the update target and the authentication controller 460 is not the update target, the controller 470 may determine whether the user enters the vehicle 110 using the smart key 300 or the digital key. The controller 470 may identify whether the smart key 300 or the digital key is used to enter the vehicle 110 with reference to a vehicle access history.

If it is determined that the user enters the vehicle 110 using the smart key 300 or the digital key, the controller 470 may start to perform an OTA software update when the ignition is off. When starting the OTA software update, the controller 470 may transmit a software update package to the update target to proceed with a software update.

If it is determined that the user enters the vehicle 110 using the smart key 300 or the digital key, the controller 470 may output information for notifying the user that he or she needs to enter the vehicle 110 using the smart key 300 or the digital key when the user uses the vehicle 110 at a later time. The controller 470 may notify the user that the smart key 300 or the digital key is required to proceed with the software update via the user interface 440.

If the user does not enter the vehicle 110 using the smart key 300 in the state in which it is identified that the biometric recognition controller 450 and the authentication controller 460 are the update targets, if the user does not enter the vehicle 110 using the smart key 300 or the biometric recognition function in the state in which the authentication controller 460 is the update target and the biometric recognition controller 450 is not the update target, and/or if the user does not enter the vehicle 110 using the smart key 300 or the digital key in the state where the biometric recognition controller 450 is the update target and the authentication controller 460 is not the update target, the controller 470 may fail to execute an OTA software update when the ignition is off.

If it is identified that the biometric recognition controller 450 and the authentication controller 460 are not the update targets, the controller 470 may output guidance information indicating that it is possible to use all vehicle access authenticators and it is possible to proceed with the OTA software update during the OTA software update. The controller 470 may perform an OTA software update when the ignition is off, for example, during or after outputting the guidance information.

Figure 5A:
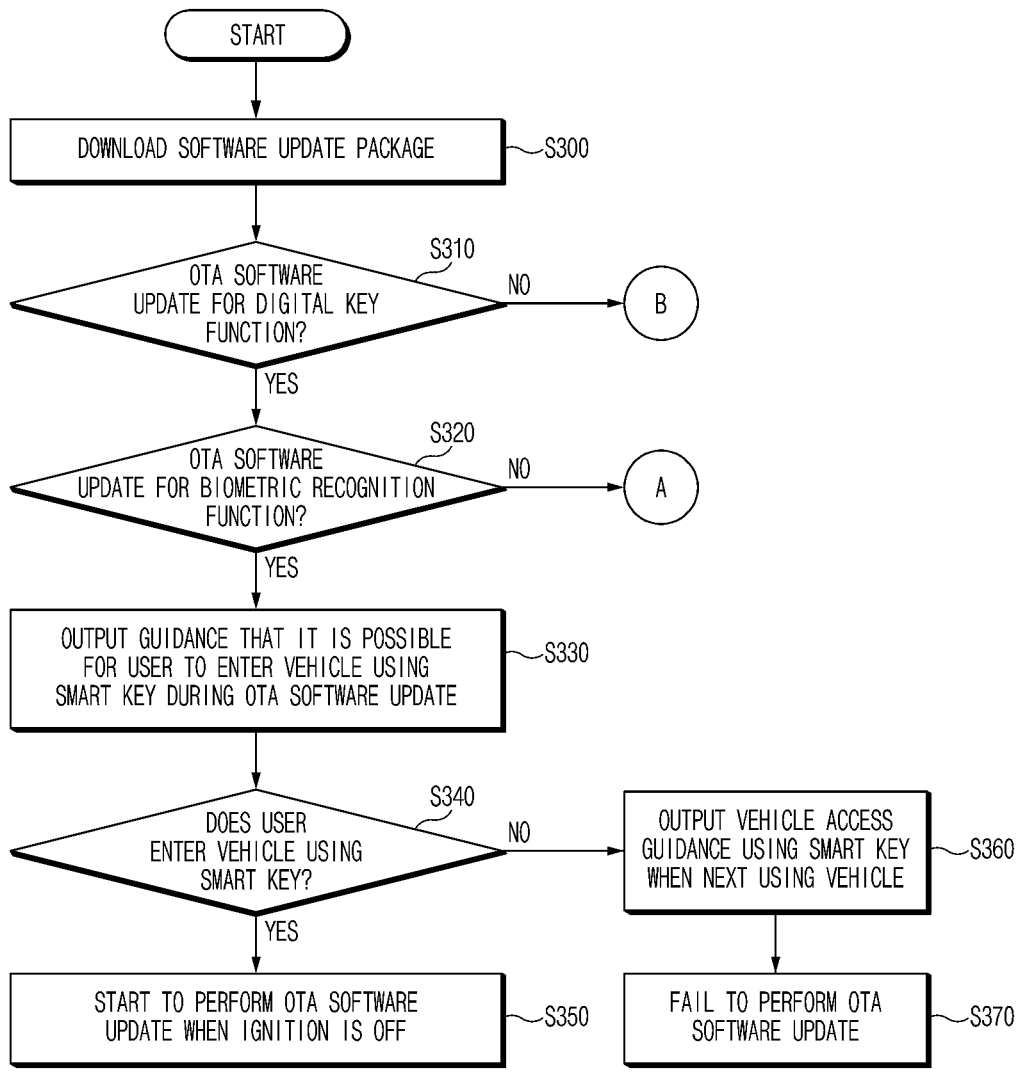
FIGS. 5A, 5B, and 5C are flowcharts illustrating a vehicular OTA software update method.
Figure 5B:
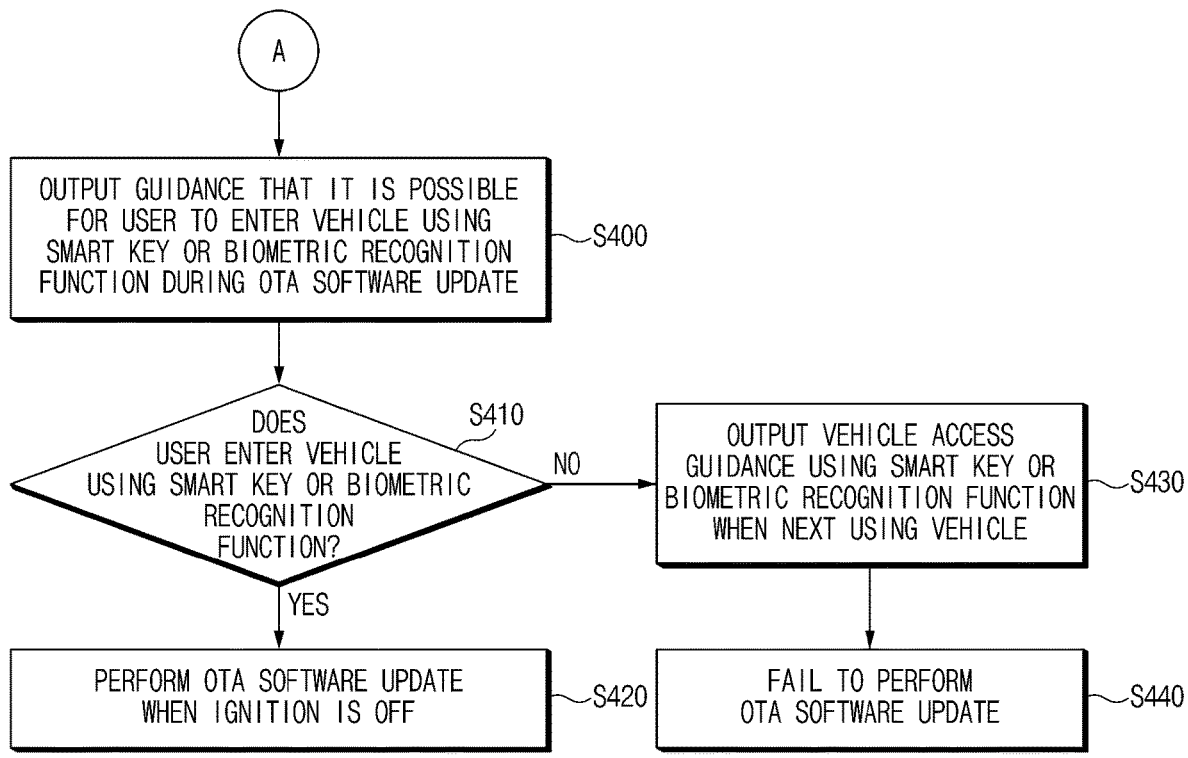
Figure 5C:
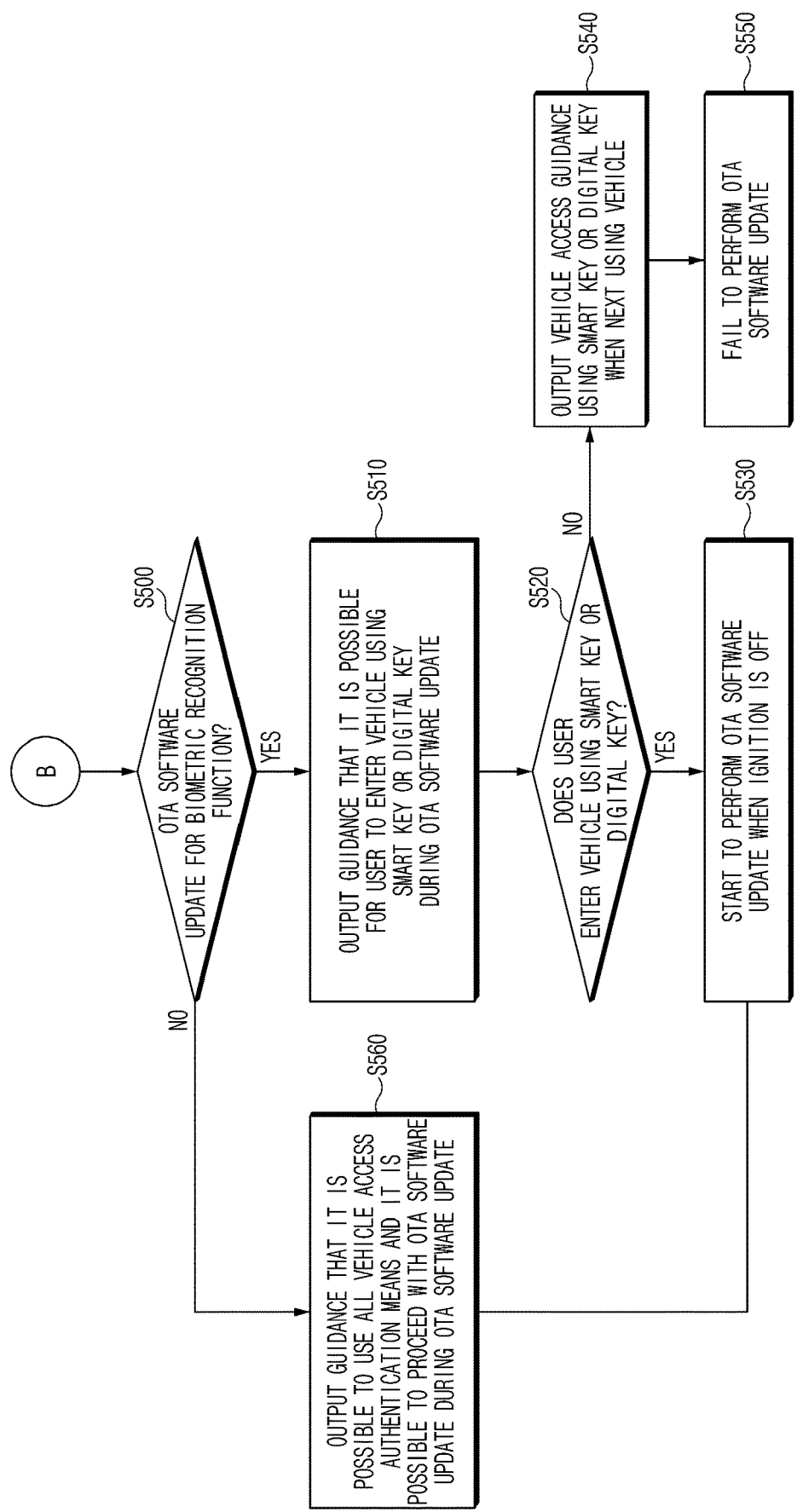

FIGS. 5A to 5C are flowcharts illustrating a vehicular OTA software update method. In an example, the vehicular OTA software update method may be executed by a controller 470 shown in FIG. 4. A description will be given assuming that it is possible for a user to enter a vehicle 110 using a smart key 300 during an OTA software update.

In S300, the controller 470 may download a software update package from a server 100 of FIG. 1 using communication device 410 of FIG. 4. The controller 470 may request the communication device 410 to download new software of an update target. The communication device 410 may request the server 100 to download a software update package including new software of the update target depending on the request of the controller 470 and may receive the software update package (or ROM data) transmitted from the server 100.

In S310, the controller 470 may determine whether to perform an OTA software update for a digital key function. For example, the controller 470 may identify whether the update target is an authentication controller 460 of FIG. 4.

If it is determined to perform the OTA software update for the digital key function, in S320, the controller 470 may determine whether to perform an OTA software update for a biometric recognition function. For example, the controller 470 may identify whether the update target is a biometric recognition controller 450 of FIG. 4.

If it is determined to perform the OTA software update for the biometric recognition function, in S330, the controller 470 may output guidance information that it is possible for the user to enter the vehicle 110 using the smart key 300 during the OTA software update. The controller 470 may guide the user to enter the vehicle 110 by using the smart key 300 as a vehicle access authenticator during the OTA software update. For example, the controller 470 may output a pop-up message that it is possible to perform a door lock (or a vehicle lock) of the vehicle 110 using the smart key 300 during the OTA software update on the display.

In S340, the controller 470 may determine whether the user enters the vehicle 110 using the smart key 300. The controller 470 may identify whether the smart key 300 is used to enter the vehicle 110 based on a vehicle access history provided from a vehicle access system. As a result, the controller 470 may determine whether the user possesses the smart key 300. For example, if it is identified that the user performs the door unlock of the vehicle 110 using the smart key 300 when using the vehicle 110 this time, the controller 470 may determine that the user possesses the smart key 300.

If it is determined that the user enters the vehicle 110 using the smart key 300, in S350, the controller 470 may start an OTA software update when the ignition is off. If the ignition is off, the controller 470 may transmit a software update package to an update target (e.g., a performance controller 430, the biometric recognition controller 450, and/or the authentication controller 460 of FIG. 4). The update target may update software installed in the update target to software of a latest version using the software update package.

If it is determined that the user does not enter the vehicle 110 using the smart key 300 in S340, in S360, the controller 470 may output guidance information indicating that the user needs to enter the vehicle 110 using the smart key 300 when the user uses the vehicle 110 at a later time. If it is determined that another access authenticator (e.g., biometric recognition or a digital key except for the smart key 300 is used to enter the vehicle 110), the controller 470 may display a guidance message (e.g., "The smart key is required for an OTA software update.") on a display of the user interface 440.

After S360, in S370, the controller 470 may fail to perform an OTA software update when the ignition is off.

If it is determined not to perform the OTA software update for the biometric recognition function in S320, in S400, the controller 470 may output guidance information that it is possible for the user to enter the vehicle 110 using the smart key 300 or a biometric recognition function during the OTA software update. If the biometric recognition controller 450 is not the update target, the controller 470 may output a pop-up message indicating that it is possible for the user to enter the vehicle 110 using the smart key 300 or the biometric recognition function during the OTA software update on the display of the user interface 440.

In S410, the controller 470 may determine whether the user enters the vehicle 110 using the smart key 300 or the biometric recognition function. The controller 470 may identify whether to execute a door unlock of the vehicle 110 by using the smart key 300 or the biometric recognition function based on a vehicle access history.

If it is determined that the user enters the vehicle 110 using the smart key 300 or the biometric recognition function, in S420, the controller 470 may execute an OTA software update when the ignition is off. The controller 470 may transmit a software update package to the update target to perform a software update.

If it is determined that the user does not enter the vehicle 110 using the smart key 300 or the biometric recognition function in S410, in S430, the controller 470 may output guidance information indicating that the user needs to enter the vehicle 110 using the smart key 300 or the biometric recognition function when the user uses the vehicle 110 at a later time. For example, if it is determined that the user enters the vehicle 110 another using vehicle access authenticator (e.g., a digital key) rather than the smart key 300 and the biometric recognition function, the controller 470 may output guide information (e.g., guide information for guiding the user to possess the smart key 300 or enter the vehicle 110 using the biometric recognition function when the user uses the vehicle 110 at a later time) on the display in the form of a pop-up.

After S430, in S440, the controller 470 may fail to perform an OTA software update when the ignition is off.

If it is determined not to perform the OTA software update for the digital key function in S310, in S500, the controller 470 may determine whether to perform an OTA software update for a biometric recognition function. If the authentication controller 460 is not the update target, the controller 470 may identify whether the biometric recognition controller 450 is the update target.

If it is determined to perform the OTA software update for the biometric recognition function in S500, in S510, the controller 470 may output guidance information that it is possible for the user to enter the vehicle 110 using the smart key 300 or the digital key during the OTA software update. For example, the controller 470 may output that it is possible for the user to enter the vehicle 110 using the smart key 300 or the digital key during the OTA software update (e.g., as a voice message) to notify the user of it.

In S520, the controller 470 may determine whether the user enters the vehicle 110 using the smart key 300 or the digital key. The controller 470 may identify whether the smart key 300 or the digital key is used to enter the vehicle 110 with reference to a vehicle access history.

If it is determined that the user enters the vehicle 110 using the smart key 300 or the digital key, in S530, the controller 470 may start to perform an OTA software update when the ignition is off. When starting the OTA software update, the controller 470 may transmit a software update package to the update target to proceed with a software update.

If it is determined that the user does not enter the vehicle 110 using the smart key 300 or the digital key in S520, in S540, the controller 470 may output information for guiding the user to enter the vehicle 110 using the smart key 300 or the digital key when the user uses the vehicle 110 at a later time. The controller 470 may notify the user that the smart key 300 or the digital key is required to proceed with the software update via the user interface 440.

After S540, in S550, the controller 470 may fail to perform an OTA software update when the ignition is off.

If it is determined not to perform the software update for the biometric recognition function in S500, in S560, the controller 470 may output information indicating that it is possible to use all vehicle access authenticator and it is possible to proceed with the OTA software update during the OTA software update. In S530, the controller 470 may perform an OTA software update when the ignition is off.

An aspect of the present disclosure provides a vehicular OTA software update apparatus for identifying a location of an access authenticator, whether the access authenticator is an update target, and/or whether the access authenticator is used to enter a vehicle upon an OTA software update to determine to perform the OTA software update and a method thereof.

Another aspect of the present disclosure provides a vehicular OTA software update apparatus for enabling a vehicle lock in the situation where an OTA software update is performed without a smart key and a method thereof.

Another aspect of the present disclosure provides a vehicular OTA software update apparatus for identifying whether a smart key is present in the interior of the vehicle when starting an OTA software update and performing the OTA software update only when the smart key is present in the interior of the vehicle and a method thereof.

Another aspect of the present disclosure provides a vehicular OTA software update apparatus for performing an OTA using another vehicle access software update even when authenticator except for the smart key and a method thereof.

Another aspect of the present disclosure provides a vehicular OTA software update apparatus for notifying the user that it is possible to perform an OTA software update for each vehicle access authenticator in advance and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicular OTA software update apparatus may include a communication device that downloads a software update package from a server and a controller connected with the communication device. The controller may determine whether it is possible to perform a software update based on at least one of a location of a vehicle access authenticator, whether the vehicle access authenticator is an update target, whether the vehicle access authenticator is used to enter a vehicle, or a combination thereof, after the downloading of the software update package is completed, and may perform a software update of the update target using the software update package, when it is determined that it is possible to perform the software update.

The vehicle access authenticator may include at least one of a smart key, a biometric recognition device, a digital key, or a combination thereof.

The controller may identify an intention of a user to perform the software update when the ignition is off, may determine whether a vehicle state meets a software update performance condition, when identifying an intention of the user to agree to perform the software update, may determine whether the vehicle access authenticator is present in the interior of the vehicle, when it is determined that the vehicle state meets the software update performance condition, and may determine that it is possible to perform the software update, when it is determined that the vehicle access authenticator is present in the interior of the vehicle.

The controller may determine that it is impossible to perform the software update, when it is determined that the vehicle access authenticator is not present in the interior of the vehicle, may output guidance information for proceeding with the software update, and may reattempt to perform the software update when the ignition is next off.

The controller may identify whether at least one other vehicle access authenticator is the update target, may identify whether a user enters the vehicle using the vehicle access authenticator, when it is identified that the at least one other vehicle access authenticator is the update target, and may determine that it is possible to perform the software update, when it is determined that the user enters the vehicle using the vehicle access authenticator.

The controller may determine whether the user enters the vehicle using another vehicle access authenticator which is not the update target among the at least one other vehicle access authenticator or the vehicle access authenticator based on a vehicle access history, whether the other vehicle access authenticator which is not the update target is present, and may determine that it is possible to perform the software update, when it is determined that the user enters the vehicle using the other vehicle access authenticator which is not the update target or the vehicle access authenticator.

The controller may output guidance information for proceeding with the software update, when it is determined that the user does not enter the vehicle using the other vehicle access authenticator which is not the update target or the vehicle access authenticator.

The controller may fail to perform the software update, when it is determined that the user does not enter the vehicle using the other vehicle access authenticator which is not the update target or the vehicle access authenticator.

The controller may output information indicating that it is possible for the user to enter the vehicle using the other vehicle access authenticator which is not the update target among the at least one other vehicle access authenticator or the vehicle access authenticator, when the other vehicle access authenticator which is not the update target is present.

The vehicular OTA software update apparatus may further include a body controller that controls a door lock and a door unlock of the vehicle. The controller may perform the door lock of the vehicle using the body controller depending on a control command transmitted from the vehicle access authenticator during the software update.

According to another aspect of the present disclosure, a vehicular OTA software update method may include downloading, by a controller, a software update package from a server using a communication device, determining, by the controller, whether it is possible to perform a software update based on at least one of a location of a vehicle access authenticator, whether the vehicle access authenticator is an update target, whether the vehicle access authenticator is used to enter a vehicle, or a combination thereof, after the downloading of the software update package is completed, and performing, by the controller, a software update of the update target using the software update package, when it is determined that it is possible to perform the software update.

The vehicle access authenticator may include at least one of a smart key, a biometric recognition device, a digital key, or a combination thereof.

The determining of whether it is possible to perform the software update may include identifying an intention of a user to perform the software update when the ignition is off, determining whether a vehicle state meets a software update performance condition, when identifying an intention of the user to agree to perform the software update, determining whether the vehicle access authenticator is present in the interior of the vehicle, when the vehicle state meets the software update performance condition, and determining that it is possible to perform the software update, when it is determined that the vehicle access authenticator is present in the interior of the vehicle.

The vehicular OTA software update method may further include determining that it is impossible to perform the software update, when it is determined that the vehicle access authenticator is not present in the interior of the vehicle, outputting guidance information for proceeding with the software update, and reattempting to perform the software update when the ignition is next off.

The determining of whether it is possible to perform the software update may include identifying whether at least one other vehicle access authenticator is the update target, identifying whether a user enters the vehicle using the vehicle access authenticator, when it is identified that the at least one other vehicle access authenticator is the update target, and determining that it is possible to perform the software update, when it is determined that the user enters the vehicle using the vehicle access authenticator.

The vehicular OTA software update method may further include determining whether the user enters the vehicle using another vehicle access authenticator which is not the update target among least one other vehicle access the at authenticator or the vehicle access authenticator based on a vehicle access history, when the other vehicle access authenticator which is not the update target is present, and determining that it is possible to perform the software update, when it is determined that the user enters the vehicle using the other vehicle access authenticator which is not the update target or the vehicle access authenticator.

The vehicular OTA software update method may further include outputting guidance information for proceeding with the software update, when it is determined that the user does not enter the vehicle using the other vehicle access authenticator which is not the update target or the vehicle access authenticator.

The vehicular OTA software update method may further include failing to perform the software update, when it is determined that the user does not enter the vehicle using the other vehicle access authenticator which is not the update target or the vehicle access authenticator.

The vehicular OTA software update method may further include outputting information indicating that it is possible for the user to enter the vehicle using the other vehicle access authenticator which is not the update target among the at least one other vehicle access authenticator or the vehicle access authenticator, when the other vehicle authenticator which is not the update target is present.

The vehicular OTA software update method may further include controlling a body controller to perform a door lock of the vehicle depending on a control command transmitted from the vehicle access authenticator during the software update.

Of the present disclosure, the system described herein may identify a location of an access authenticator (s), whether the access authenticator (s) is/are update target (s), and/or whether the access authenticator (s) is/are used to enter a vehicle upon an OTA software update, thus determining whether to perform the OTA software update.

According to various features of the present disclosure, it may be possible that a vehicle lock in the situation where an OTA software update is performed without a smart key.

According to various features of the present disclosure, it may be possible to identify whether a smart key is present in the interior of the vehicle when starting an OTA software update and may perform the OTA software update only when the smart key is present in the interior of the vehicle, thus preventing a situation where it is impossible to perform a vehicle lock during the OTA software update from occurring.

According to various features of the present disclosure, it may be possible to perform an OTA software update even when using another vehicle access authenticator except for the smart key, thus improving the convenience of the user.

According to various features of the present disclosure, it may be possible to notify the user that it is possible to perform an OTA software update for each vehicle access authenticator in advance, thus allowing the user to identify a condition for proceeding with an OTA software update.

Hereinabove, although the present disclosure has been the described with reference to various examples and accompanying drawings, aspects of the present disclosure are not limited thereto, but may be variously modified and altered by those skilled in the art to which the present disclosure pertains without departing from the spirit and scope of the present disclosure claimed in the following claims. Therefore, the illustrated examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicular over-the-air (OTA) software update method, comprising:
   downloading, by a controller, a software update package from a server using a communication device;
   after downloading of the software update package is completed, determining, by the controller, whether a software update associated with the software update package is executable based on at least one of:
   a location of a vehicle access authenticator;
   whether the vehicle access authenticator is an update target associated with the software update package; or
   whether the vehicle access authenticator is used to enter a vehicle; and
   based on a determination that the software update is executable, executing, by the controller, the software update, for the update target, using the software update package,
   wherein the software update is inexecutable based on the vehicle access authenticator not being present in the vehicle.

2. The vehicular OTA software update method of claim 1, wherein the vehicle access authenticator comprises at least one of: a smart key, a biometric recognition device, a digital key, or a combination thereof.

3. The vehicular OTA software update method of claim 1, wherein the determining of whether the software update associated with the software update package is executable comprises:
   determining, based on a power of the vehicle being off, a condition for the software update is satisfied;
   determining, based on the condition: for the software update being satisfied, whether the vehicle access authenticator is present in the vehicle; and
   determining that the software update is executable further based on the vehicle access authenticator being present in the vehicle.

4. The vehicular OTA software update method of claim 1, further comprising:
   outputting guidance information associated with the software update, based on the software update being inexecutable;
   based on a power of the vehicle being off after outputting the guidance information, reattempting to execute the software update; and
   based on the reattempting to execute the software update and based on the vehicle access authenticator being present in the vehicle, determining that the software update is executable.

5. The vehicular OTA software update method of claim 1, wherein the determining of whether the software update associated with the software update package is executable comprises:
- determining whether at least one second vehicle access authenticator, different from the vehicle access authenticator, is an update target associated with the software update package;
- based on a determination that the at least one second vehicle access authenticator is the update target associated with the software update package, determining whether a user enters the vehicle using the vehicle access authenticator; and
- based on a determination that the user enters the vehicle using the vehicle access authenticator, determining that the software update is executable.

6. The vehicular OTA software update method of claim 1, further comprising:
- determining whether a user enters the vehicle using a second vehicle access authenticator different from the vehicle access authenticator, wherein the second vehicle access authenticator is not an update target associated with the software update package; and
- based on a determination that the user enters the vehicle using the second vehicle access authenticator, determining that the software update is executable.

7. The vehicular OTA software update method of claim 6, further comprising:
- based on a determination that the user enters the vehicle without the vehicle access authenticator and the second vehicle access authenticator, outputting guidance information associated with the software update.

8. The vehicular OTA software update method of claim 6, further comprising:
- based on a determination that the user enters the vehicle without the vehicle access authenticator and the second vehicle access authenticator, suspending an execution of the software update.

9. The vehicular OTA software update method of claim 6, further comprising:
- based on a determination that the second vehicle access authenticator is present in the vehicle, outputting information indicating that it is possible for the user to enter the vehicle using the second vehicle access authenticator among a plurality of vehicle access authenticators associated with the user.

10. The vehicular OTA software update method of claim 1, further comprising:
- based on a control command transmitted from the vehicle access authenticator during the software update, controlling a body controller to perform a door lock of the vehicle.

11. A vehicular over-the-air (OTA) software update apparatus, comprising:
- a communication device configured to receive a software update package from a server; and
- a controller coupled to the communication device,
- wherein the controller is configured to:
  - after downloading of the software update package is completed, determine whether a software update associated with the software update package is executable based on at least one of:
    - a location of a vehicle access authenticator;
    - whether the vehicle access authenticator is an update target associated with the software update package; or
    - whether the vehicle access authenticator is used to enter a vehicle; and
  - execute, based on a determination that the software update is executable, the software update, for the update target, using the software update package,
  - wherein the software update is inexecutable based on the vehicle access authenticator not being present in the vehicle.

12. The vehicular OTA software update apparatus of claim 11, wherein the vehicle access authenticator comprises at least one of: a smart key, a biometric recognition device, a digital key, or a combination thereof.

13. The vehicular OTA software update apparatus of claim 11, wherein the controller is further configured to:
- determine, based on a power of the vehicle being off, a condition for the software update is satisfied;
- determine, based on the condition for the software update being satisfied, whether the vehicle access authenticator is present in the vehicle; and
- determine that the software update is executable further based on the vehicle access authenticator being present in the vehicle.

14. The vehicular OTA software update apparatus of claim 11, wherein the controller is further configured to:
- output guidance information associated with the software update, based on the software update being inexecutable;
- based on a power of the vehicle being off after outputting the guidance information, reattempt to execute the software update; and
- based on the reattempting to execute the software update and based on the vehicle access authenticator being present in the vehicle, determine that the software update is executable.

15. The vehicular OTA software update apparatus of claim 11, wherein the controller is further configured to:
- determine whether at least one second vehicle access authenticator, different from the vehicle access authenticator, is an update target associated with the software update package;
- based on a determination that the at least one second vehicle access authenticator is the update target associated with the software update package, determine whether a user enters the vehicle using the vehicle access authenticator; and
- based on a determination that the user enters the vehicle using the vehicle access authenticator, determine that the software update is executable.

16. The vehicular OTA software update apparatus of claim 11, wherein the controller is further configured to:
- determine whether a user enters the vehicle using a second vehicle access authenticator different from the vehicle access authenticator, wherein the second vehicle access authenticator is not an update target associated with the software update package; and
- based on a determination that the user enters the vehicle using the second vehicle access authenticator, determine that the software update is executable.

17. The vehicular OTA software update apparatus of claim 16, wherein the controller is further configured to:
- based on a determination that the user enters the vehicle without the vehicle access authenticator and the second vehicle access authenticator, output guidance information associated with the software update.

18. The vehicular OTA software update apparatus of claim 16, wherein the controller is further configured to:

based on a determination that the user enters the vehicle without the vehicle access authenticator and the second vehicle access authenticator, suspend an execution of the software update.

19. The vehicular OTA software update apparatus of claim 16, wherein the controller is further configured to:
based on a determination that the second vehicle access authenticator is present in the vehicle, output information indicating that it is possible for the user to enter the vehicle using the second vehicle access authenticator among a plurality of vehicle access authenticators associated with the user.

20. The vehicular OTA software update apparatus of claim 11, further comprising:
a body controller configured to control a door lock of the vehicle and a door unlock of the vehicle,
wherein the controller is configured to perform, based on a control command transmitted from the vehicle access authenticator during the software update, the door lock of the vehicle using the body controller.

* * * * *